Nov. 4, 1958    O. L. SWANSON    2,858,616
INSPECTION DEVICE

Filed June 23, 1953    4 Sheets-Sheet 1

Inventor
OSCAR L. SWANSON
By Charles L. Lorencheck
Attorney

Nov. 4, 1958
O. L. SWANSON
2,858,616
INSPECTION DEVICE
Filed June 23, 1953
4 Sheets-Sheet 2
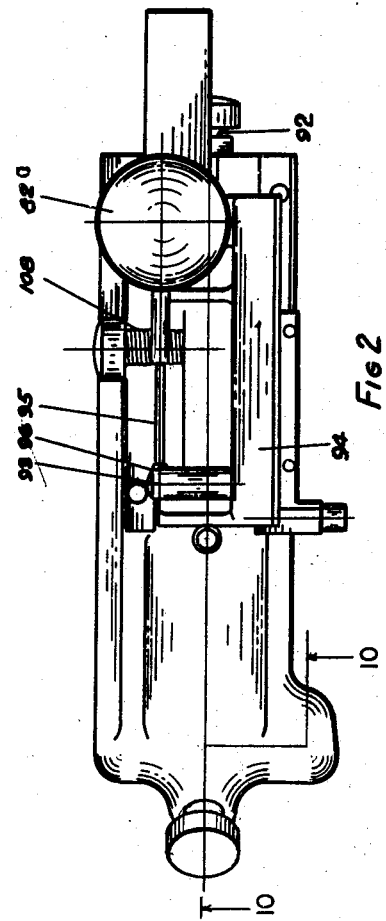
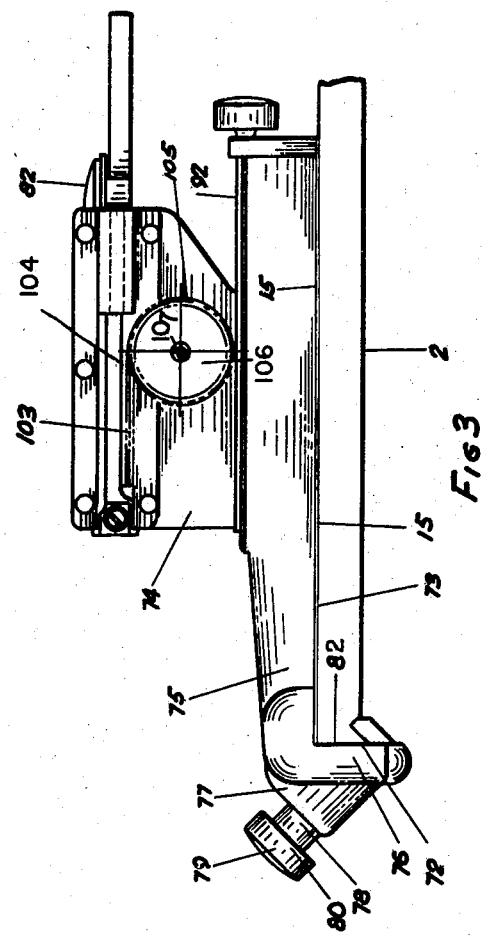
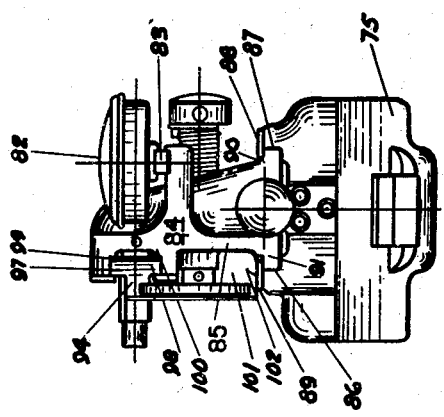
Inventor
OSCAR L. SWANSON
By Charles L. Lovercheck
Attorney Nov. 4, 1958  O. L. SWANSON  2,858,616
INSPECTION DEVICE
Filed June 23, 1953  4 Sheets-Sheet 3
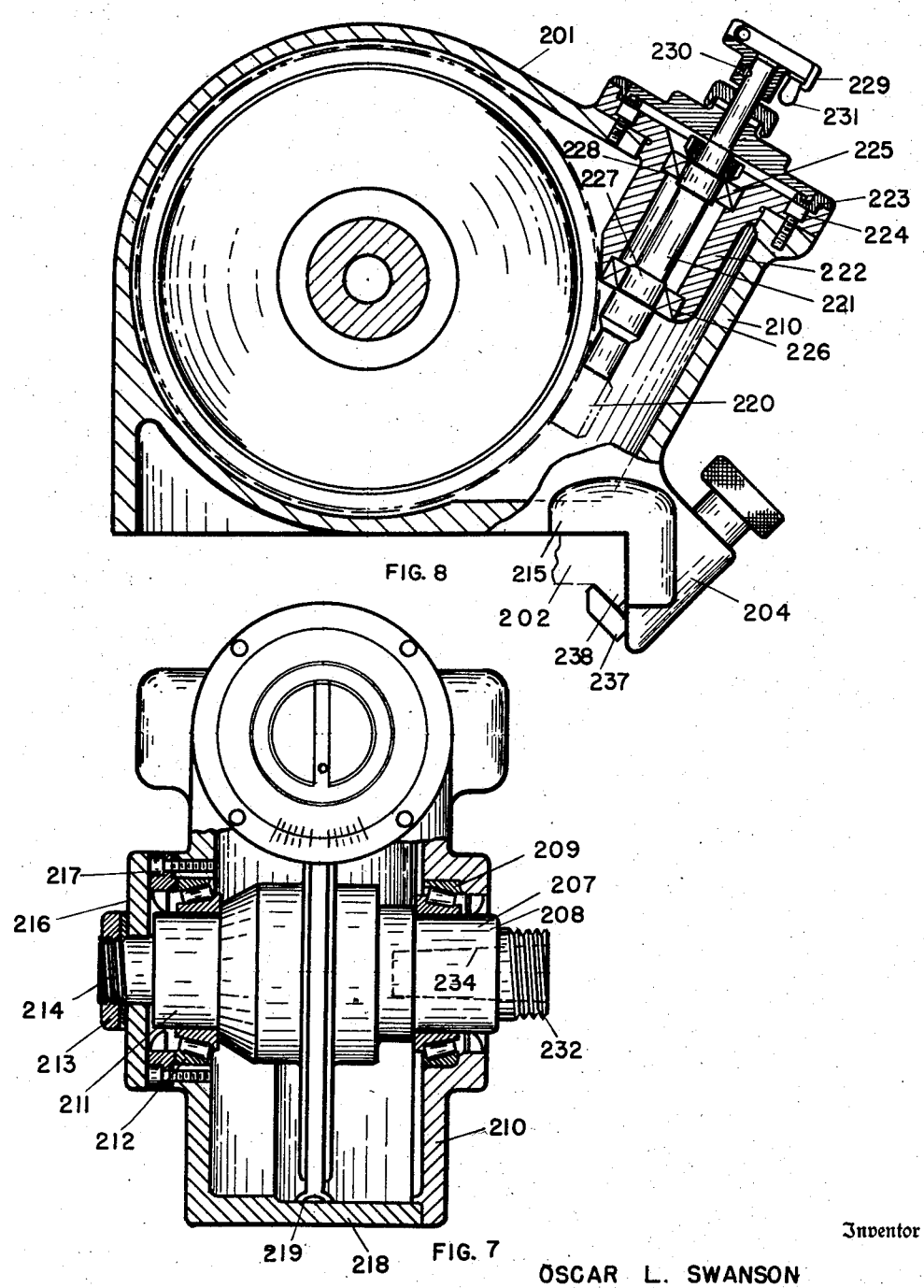
Inventor
OSCAR L. SWANSON
By
Charles L. Lverched Attorney Nov. 4, 1958     O. L. SWANSON     2,858,616
INSPECTION DEVICE
Filed June 23, 1953                                        4 Sheets-Sheet 4
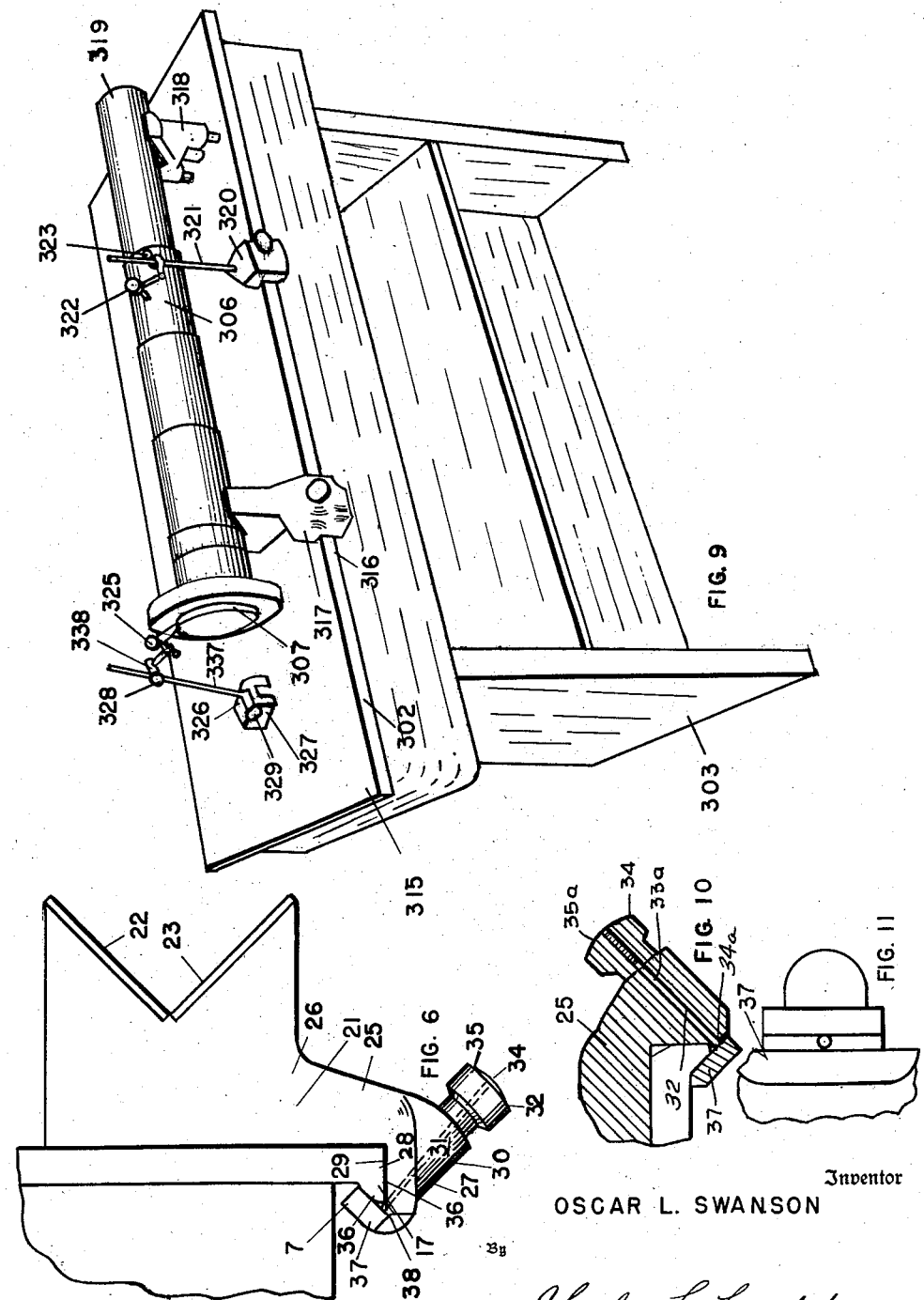
Inventor
OSCAR L. SWANSON
By Charles L. Lovercheck, Attorney United States Patent Office 2,858,616
Patented Nov. 4, 1958

2,858,616

INSPECTION DEVICE

Oscar L. Swanson, Erie, Pa.

Application June 23, 1953, Serial No. 363,636

5 Claims. (Cl. 33—174)

This invention relates generally to measuring devices and more particularly to precision tables whereon tools and fixtures may be mounted for testing and inspection of manufactured parts which must be made to extremely small tolerances in their dimensions.

In inspection tables made according to previous designs and of the type with which I am familiar, the various fixtures used in the testing procedure were located on a machined plate or machined surface. The various fixtures could be moved around on the surface and, in order to clamp the fixtures to the surface, various makeshift clamps were required. Such makeshift clamps required considerable time to select for a given application and time and inconvenience to use. Considerable difficulty in testing was encountered because the fixtures were inclined to move around on the table or machined plate and considerable time was required to clamp the fixtures even where it was possible to clamp them. The clamps used were frequently unsuitable for the purpose.

It is, accordingly, an object of my invention to overcome the above and other defects in prior constructions of testing and inspecting devices and, more particularly, to provide an inspection table wherein the various fixtures and parts for use in the testing and inspection processes can be easily and readily clamped in place to the table.

Another object of my invention is to provide a device for use in measuring and testing and inspection of precision parts which will be simple in construction, economical in cost, economical in manufacture, and efficient in operation.

Another object of the invention is to provide a novel type of connection for use between an inspection table and inspection fixtures.

Another object of my invention is to provide a comprehensive inspection unit which will accommodate all general inspection devices and eliminate the usual makeshift clamps incidental to devices.

Another object of the invention is to provide a testing and inspection device wherein the fixtures for testing and inspection can be clamped to a table in a position where they will be convenient for use.

Another object of my invention is to provide an inspection table having a plurality of centers which can be readily attached to the table in operative position.

Another object of the invention is to provide an inspection table in combination with a V-block which can be readily attached to the table.

Another object of my invention is to provide an inspection table in combination with a tool maker's sine block which can be readily attached to the table.

Another object of my invention is to provide an inspection table in combination with a concentricity gauge which can be readily attached to the table for use with the other fixtures in this invention.

Another object of the invention is to provide an inspection device which is extremely rigid and has an accurately machined surface whereon the conventional type of inspection fixtures can be utilized.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

In the drawings:

Fig. 2 shows a top view of a measuring device according to my invention;

Fig. 3 shows an end view of the cam checker shown in Fig. 1;

Fig. 4 is a front view of the cam checker shown in Figs. 2 and 3;

Fig. 6 is a detailed view of the device for attaching the device to the table;

Fig. 7 is a side view partly in cross section of an indexing device for use on my novel table;

Fig. 8 is a cross sectional view of the indexing device shown in Fig. 7;

Fig. 9 is a perspective view of a concentricity testing device for use on my novel table;

Fig. 10 is a cross sectional view taken on line 10—10 of Fig. 2; and

Fig. 11 is a view of the clamping device shown in Fig. 5.

Figure 5:
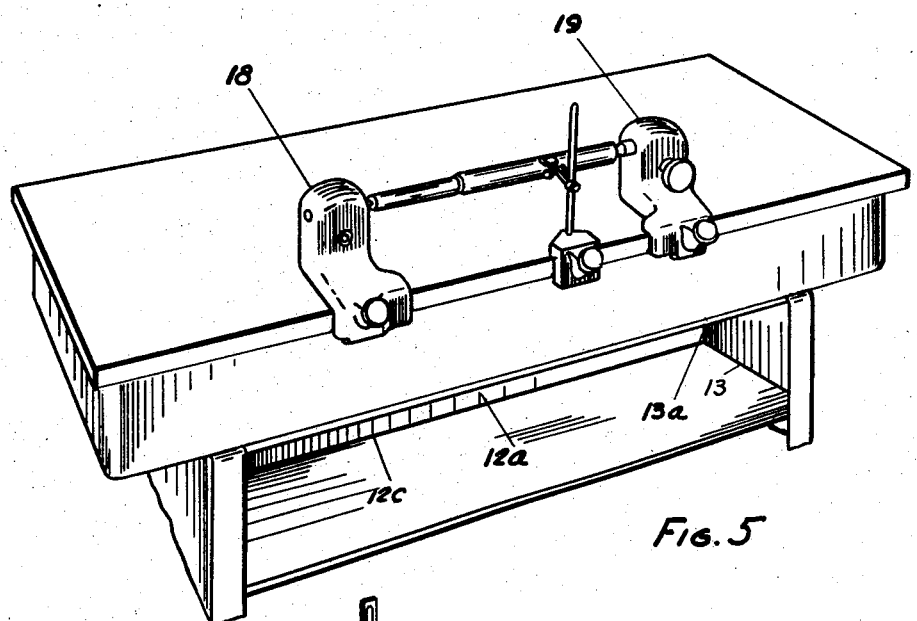
Fig. 5 is a perspective view of my inspection device with an article of manufacture mounted between centers for inspection.
Figure 1:
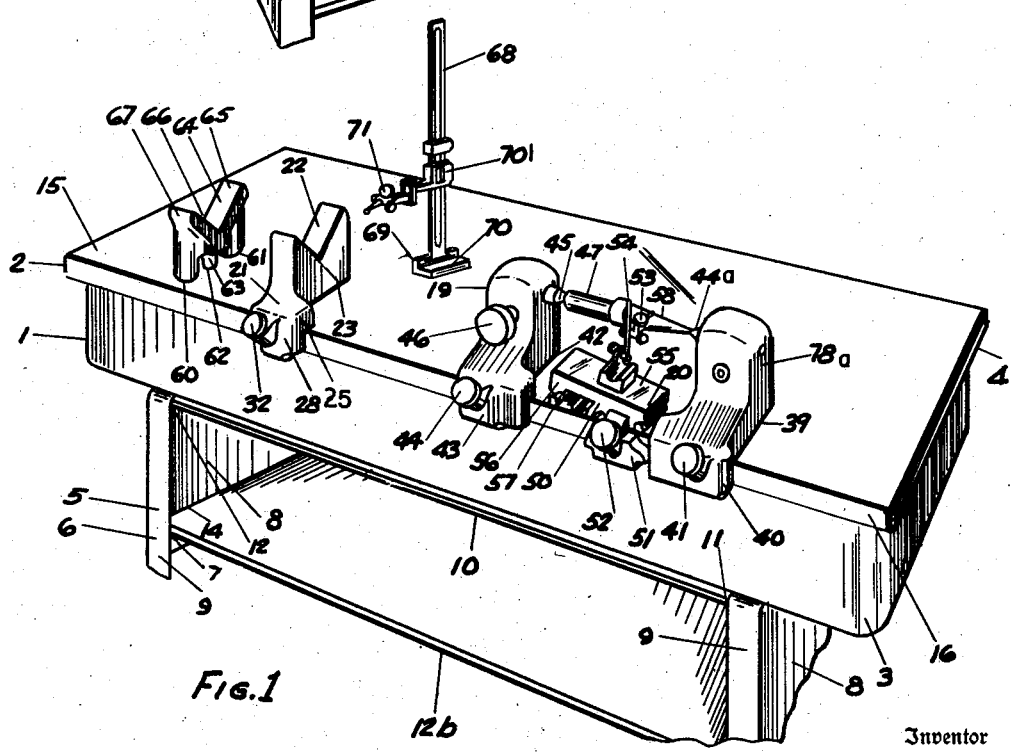
Fig. 1 shows an inspection table according to my invention having fixtures mounted in place on the inspection device.

Referring now to the drawings, in Fig. 1, I show an inspection table 1 with a top 2 and a reinforcing skirt 3 which may be attached to the top 2 under the edge 4 by welding or other similar rigid fastening means. The top 2 and skirt 3 are supported on base 5 which is made up of end legs 8 which are preferably made of channel shaped heavy sheet metal having flanges 9 formed integral therewith. The legs 8 are connected near the top by a heavy reinforcing member 10 welded to the legs at 11 and 12. Intermediate the floor and the top of the legs 8, a heavy plate 12b may be welded to the legs at 13 and 14 and at 7. A plate 12a is welded to the legs at 13a and to the plate 12b at 12c, thereby providing a brace and reinforcing member for the table and a convenient shelf for storing the various fixtures which are associated with the invention.

The top surface 15 of the table 1 is machined and preferably scraped or ground to a very accurate flat surface and is adapted to accurately support the ordinary inspection fixtures and tools such as height gauges, indicators, indexing heads, tool maker's sine blocks, etc.

The front edge 16 of the table 1 has a lip 17 formed integral therewith to cooperate with complementary members on the center supports 18 and 19, the tool maker's sine plate 20, and the V-block 21. The V-block 21 has accurately finished jaws 22 and 23 disposed at right angles to each other in a conventional manner and the bottom surface is preferably machined accurately to rest on the top surface 15 of the table top. The V-block 21 has the bracket 25 integrally attached thereto at 26 and the bracket 25 has the downwardly extending flange 27 which has a finished surface 28 designed to rest on the edged surface 29 of the table. A boss 30 is integrally attached to the downwardly extending flange 27 at 31 and a lock screw or bolt 32 is fixedly attached to a plate 37 at 34a by welding or brazing and the plate 37 is proximately disposed to the flange 27 at 38. The bolt 32 extends through a bored hole 33a in the boss 30. A threaded nut 34 is received on a threaded end 35a of the bolt 32. By tightening the nut 34, the bolt 32 is pulled through the hole 33a and it will pull the plate 37 toward the boss 30 and, therefore, clamp the lip 17 between the plate 37 and the boss 30. The bolt 32 extends past the edge of the lip 17 as shown in Fig. 6. The nut 34 has a knurled surface 35 for convenience in operating the screw. The lip 17 has an angularly disposed machined surface 36 which slidably engages the upwardly and inwardly extending plate 37. When the V-block 21 has been slid along the edge of the table to the desired location, the screw 32 can be tightened to lock the V-block 21 against further sliding in that position. The screw 32 will draw the plate 37 toward the flange 27 and since the lip 17 is therebetween, a clamping action on the lip 17 will result.

The center device 78a has the table engaging surface 39 which engages the finished top surface 15 of the table 1 and a downwardly extending figure 40 similar to the flange 27 described in connection with the V-block 21 in Fig. 6. A locking screw 41 similar to the screw 32 described in connection with the V-block 21 holds the center in a desired position.

The center support 19 similar to center 78a is supported on the surface 15 of the table 1 having surface 42 engaging the surface of the table and downwardly extending flange 43 and locking bolt 44 corresponding respectively to the downwardly extending flange 27 and locking bolt 32 described in connection with the V-block 21. The center point 44a is supported in the center device 78a and the center 45 is supported in the center device 19. The handle 46 is provided for longitudinally adjusting the piece of work 47 illustrated as being inspected in the device as supported by the center points 44a and 45.

A tool maker's sine plate 50 is shown supported on the table 1. The sine plate 50 has the flange member 51 and locking bolt 52 which correspond respectively to the flange 27 and locking member 32 described in connection with the V-block 21 shown in Fig. 6. The sine plate 50 may be held in position at the edge of the table at the desired angle thereto in operative relation to the centers as shown to support, for example, a dial indicator 53 on a vertical post 54. The inclination of the surface 55 may be adjusted by means of adjusting the height on the end 56. This is done by changing the thickness of the spacer 57 which supports the end 56 of the sine plate 50.

By sliding the dial indicator 53 along the surface 55, a curved surface such as the surface 58 of the work 47 which is being inspected can be checked accurately.

Precision holes may be bored in the table to receive legs 60 and 61 and a precision hole 62 may be bored to support the leg 63 of the V-block 64. The holes receiving the legs 60, 61, and 63 will be so located that the surface 65 is in perfect alignment with the surface of the jaw 22 of the V-block 21 and the surface 66 of the V-block 67 is in perfect alignment with the surface of the jaw 23 of the V-block 21. Various inspection tools and fixtures such as the indicator support 68 can be supported on bases such as the base 69 which are provided with machined or ground bottom surfaces such as surface 70 of the indicator support 68 which will rest on the top surface 15 of the table. An indicator such as indicator 71 can be vertically adjustably supported on a support as indicated by means of bracket 701.

In Figs. 2, 3, and 4, I disclose a novel type of cam checking device according to the invention. The cam checking device is adapted to be supported on the top surface 15 of the table top 2 and has the finished surface 73 adapted to rest on the top surface 15 of the table top. The cam checking device 74 has the base member 75 to support it and has the downwardly extending flange 76 integrally attached to the base 75 and an internally threaded boss 77 receives the bolt 78 having the handle 79 with the knurled surface 80 for convenience in rotating it to lock the work against sliding along the table. The flange 76 has the machined surface 82 which slidingly engages the edged surface 16 of the table. It will be apparent that by loosening the handle 79, the base 75 can be slid along the edge of the table to the desired location and locked at this location by means of the handle 79.

The dial indicator 82a is supported on the base 75 by bracket 83. The bracket 83 is supported on the transverse member or bracket 84 which is in turn supported on the vertical member 85 and it, in turn, is slidably supported by the base 75 in the ways 86 and 87 having the overlapping members 88 and 89 which hold the members 90 and 91 of the slidable member 85 in the ways 86 and 87. A stop screw 92 is threadably engaged in hole 93 in the base 75 to limit the outward movement of the member 85 once its position has been established.

The follower 93 is supported on the follower carrier 94 and engages the tip 95 of the indicator 82a at 96. The follower carrier 94 has the flanges 97 and 98 which engage ways 99 and 100 in the upper part of the bracket 84 and has the inwardly extending member 101 which slidingly engages the surface 102 of the member 85. The follower carrier 94 has a rack 103 attached to it and the rack 103 has teeth 104 which engage teeth 105 on the gear 106. The gear 106 is carried by the shaft 107 which has helical spring 108 attached thereto and to the frame. The shaft 107 is journalled in the member 85. The spring 108 tends to urge the follower 93 outward in order to maintain the dial indicator 82a at a zero reading.

In operation, the cam checking device is attached to the table by resting the base member 75 on the table and locking it in place by means of the handle 79. A piece of work is then mounted between centers such as 44a and 45 or otherwise pivotally mounted with the surface to be checked in contact with the follower 93. The stop screw 92 is then adjusted and the cam checking device 74 slides in the ways 86 and 87 until the dial indicator 82a reads zero. Then the piece of work being checked is rotated with its outside surface sliding against the follower 93. The rise of a cam can also be checked by noting the indicator deflection at various points on the periphery of the article being tested. Any irregularity in the concentricity of the surfaces will cause the follower 93 to move and, thereby, cause the dial indicator 82a to deflect, indicating the amount of irregularity. The spring 108 will maintain the follower 93 in engagement with the surface of the member being inspected.

By mounting a cam to be checked between the centers of a conventional indexing device such as shown in Figs. 7 and 8, the angular displacement of a cam for any degree of rotation can be checked. An indexing head shown in Figs. 7 and 8 is provided for use on my novel inspection table. The indexing head 201 is adapted to rest on the table top 202 on the surface 215 thereof. The handle 203 is threadably attached to the boss 204 to move the clamp 237 into engagement with the lip 238 on the edge of the table, the structure being similar to that shown in Figs. 1 and 6.

A worm gear 207 has the end 208 supported in roller bearing 209 in the housing 210. The journal end 211 is supported by roller bearing 212. A nut 213 engages a threaded end 214 of the housing 210 to hold the gear in place in the flange 227a and a grease retaining plate 216 is secured over the end of the bearing clamping ring 217 to hold the bearings in place.

The worm gear 218 has the worm 219 on the outer end thereof which is adapted to engage a worm wheel 220 which is supported on shaft 221 and shaft 221 is supported on housing 210 by the bearing supports 222 which are held in place by the grease retaining ring 223 which covers the ends of screws 224. Screws 224 extend through the bearing supports 222 and engage the housing 210 to hold the bearing supports 222 in place therein.

The bearings 225 and 226 are supported in the bearing supports 222 and engage the journalled surfaces 227 and 228 on the shaft 221. The handwheel 229 is attached by means of screws 230 at the end of the worm wheel shaft 221 and the handle 231 is provided for convenience in operation thereof.

The end 232 of the worm gear shaft has a bore 234 therethrough which is adapted to hold a tapered shank chuck or other similar article gripping means for use when the indexing head 201 is used to rotate a part similar to that shown in Fig. 1 when a cam or concentricity thereof is being set.

In Fig. 9, I disclose a concentricity testing device made up of a pair of V-block type supports 317 and 318 and two dial indicator supports 320 and 327 with dial indicators 322 and 325 supported thereon for testing the relative concentricity of the surface 306 and the surface 307. The table top 302 supported on the base 303 has a scraped or otherwise ground or machined top surface 315 and the edge has a lip 316 similar to the lip shown in Fig. 10. The lip 316 supports the V-block 317 which is similar to the V-block shown in Fig. 10. A V-block 318 similar to the V-block 64 shown in Fig. 1 is provided to support the shaft 319 to be tested. Dial indicator support 320 has an upwardly extending support bar 321 which supports the dial indicator 322 which is clamped to the upwardly extending support bar 321 by means of the clamp 323. The dial indicator 325 is supported on the base 326 which has a ground surface engaging the surface 315 of the table top and clamp 338 is adjustably mounted on the base 326 by means of the adjusting screws 329. The dial indicator 325 is supported on the upwardly extending support bar 337 and vertically adjustable thereon by means of a handwheel 328 which controls a conventional clamp 338.

It will be apparent that when the indicators 322 and 325 are set up as shown and their dials set at zero, when the shaft 319 is rotated, the difference in reading of the dial indicators 322 and 325 will indicate the variation in concentricity of the surfaces 306 and 307 being tested. It is apparent that the shaft 319 can be rotated by means of an indexing head such as that shown in Figs. 7 and 8 in order to move the article through accurate angular units of movement to check the concentricity at various points of angular rotation of the shaft 319.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, an inspection table and means for testing and inspecting articles of manufacture thereon comprising a table having an accurately finished top surface, and an accurately finished edge, said edge being disposed at substantially a right angle to said top surface and extending downwardly therefrom, a lip attached to said table along said finished edge, said lip having an angularly disposed surface on the side thereof remote from said top surface, said angularly disposed surface on said lip extending from said top surface downwardly and toward said accurately finished edge, means to attach testing fixtures to said lip, said means comprising a body member having an accurately finished surface engaging said top surface of said table, a vertically extending flange having a surface engaging said edge of said table, an upwardly and inwardly extending plate, and clamping means attaching said plate to said flange, said plate being held by said clamping means in firm engagement with said lip and holding said means to attach testing fixtures to said lip in firm engagement with said top surface.

2. The combination recited in claim 1 wherein said clamping means comprises a threaded member attached to said body and to said member, and a threaded member cooperating with said first threaded member locking said first threaded member to said body with said lip therebetween.

3. The combination recited in claim 2 wherein a second body similar to said first body is attached to said lip in spaced relation to said first body and said bodies have V-shaped blocks supported thereon, said V-blocks overlying said table.

4. The combination recited in claim 3 wherein two dial indicators are supported at spaced points adjacent said V-block whereby the concentricity of an article of manufacture supported in said V-block can be determined.

5. The combination recited in claim 3 wherein an indexing head is attached to said lip and disposed to rotate an article of manufacture supported in said V-block.

References Cited in the file of this patent

UNITED STATES PATENTS

| | | |
|---|---|---|
| Re. 22,953 | Praeg | Dec. 23, 1947 |
| 1,122,069 | Brown | Dec. 22, 1914 |
| 1,338,670 | Bolton | May 4, 1920 |
| 1,415,246 | Kline | May 9, 1922 |
| 1,654,213 | Einstein | Dec. 27, 1927 |
| 1,971,157 | Johnson | Aug. 21, 1934 |
| 2,178,264 | Meyer | Oct. 31, 1939 |
| 2,201,454 | Reich | May 21, 1940 |
| 2,309,142 | Stafford | Jan. 26, 1943 |
| 2,359,018 | Balk | Sept. 26, 1944 |
| 2,501,148 | Weis | Mar. 21, 1950 |
| 2,504,961 | Braaten | Apr. 25, 1950 |